Nov. 10, 1959  A. R. GOBAT  2,911,773
METHOD OF CUTTING SEMICONDUCTIVE MATERIAL
Filed June 18, 1957  2 Sheets-Sheet 1

Inventor
ANDRE R. GOBAT
By Bernard E. Franz
Attorney

Nov. 10, 1959  A. R. GOBAT  2,911,773
METHOD OF CUTTING SEMICONDUCTIVE MATERIAL
Filed June 18, 1957  2 Sheets-Sheet 2

Inventor
ANDRE R. GOBAT
By Bernard E. Franz
Attorney

United States Patent Office 2,911,773
Patented Nov. 10, 1959

2,911,773

METHOD OF CUTTING SEMICONDUCTIVE MATERIAL

Andre R. Gobat, North Caldwell, N.J., assignor to International Telephone and Telegraph Corporation, Nutley, N.J., a corporation of Maryland Application June 18, 1957, Serial No. 666,352

11 Claims. (Cl. 51—283)

This invention relates to a method of cutting semi-conductive material and more particularly to a method of dividing a block of material into small units for transistors or diodes.

In prior techniques for dividing a block of material such as germanium or silicon into small units such as bars or dice for transistors or diodes, the block is first sliced into slabs and the slabs are then cut into bars or dice. The method of slicing into slabs has proved very troublesome, because complicated mounting arrangements were necessary, and the deep cuts required were not as accurate as desired. Also since the cuts must be deep enough to extend through the block of material, they must also be relatively wide, thus entailing a large waste of material. It is then necessary to attach the slabs to a mount with adhesive, and to remove the adhesive after cutting is completed. This entire operation has proved to be costly, complex and wasteful.

The principal object of this invention is to provide a simple inexpensive method of cutting a block of semi-conductive material into small units with a minimum of waste.

According to the principal aspect of the present invention, parts are cut out of a block of material by making separated spaced cuts through one surface of the material which intersect within the body thereof.

According to another aspect of the present invention, parts are cut out of a block of material by making cuts in a first series of parallel planes through one surface of the block and making cuts in a second series of parallel planes through said surface, which intersect said first planes within said body to thereby progressively remove pieces from the block. The cuts may be relatively shallow and therefore relatively narrow and accurate.

In a preferred embodiment of the invention each of the cuts is made at 45 degrees to a surface of the block so that the two series of planes are perpendicular to each other and the removed units have a square cross section.

According to a further feature of the invention, cuts may be made in planes mutually perpendicular to the first two series of planes through said surface, to thereby divide the block into dice.

Any suitable cutting techniques may be used such as, for example, by diamond cutting disks or by ultrasonic machining.

The foregoing and other objects and features of this invention and the manner of attaining them will become more apparent and the invention itself will be best understood by reference to the following description of embodiments of the invention taken in conjunction with the accompanying drawings comprising Figs. 1 to 5, wherein.

Figure 1:
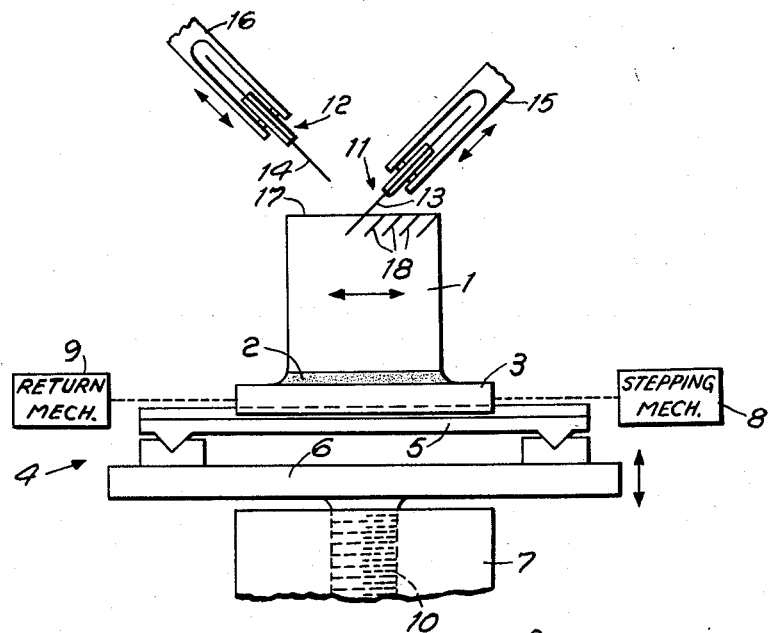
Figs. 1 and 2 are diagrammatic illustrations showing a method of cutting a block of semi-conductive material with diamond cutting wheels.

Referring to Fig. 1, a block of semi-conductive material 1 such as germanium or silicon is attached by an adhesive 2 such as quartz cement to the upper plate 3 of base assembly 4. The base assembly 4 comprises members 3, 5, 6 and 7. Arrangements are provided for moving block 1 in any of the X, Y, or Z directions, that is, left and right, vertically, or in and out, respectively. The stepping mechanism 8 and the return mechanism 9 control movement to the right and to the left, respectively. The vertical movement arrangement includes screw 10 which is actuated by rotation of member 7. Member 5 moves in and out (in the Z axis) in the track of member 6. Cutting wheels 11 and 12 having diamond cuttings edges 13 and 14 respectively are shown as mounted in holders 15 and 16 respectively. Driving means (not shown) is provided for each wheel. The cutting plane of each of the cutting wheels 11 and 12 is perpendicular to the other and at 45 degrees to the upper surface 17 of block 1. Each of the cutting wheels is mounted for movement toward or away from block 1 along an axis in its cutting plane, as indicated by the double arrows adjacent thereto.

Figure 2:
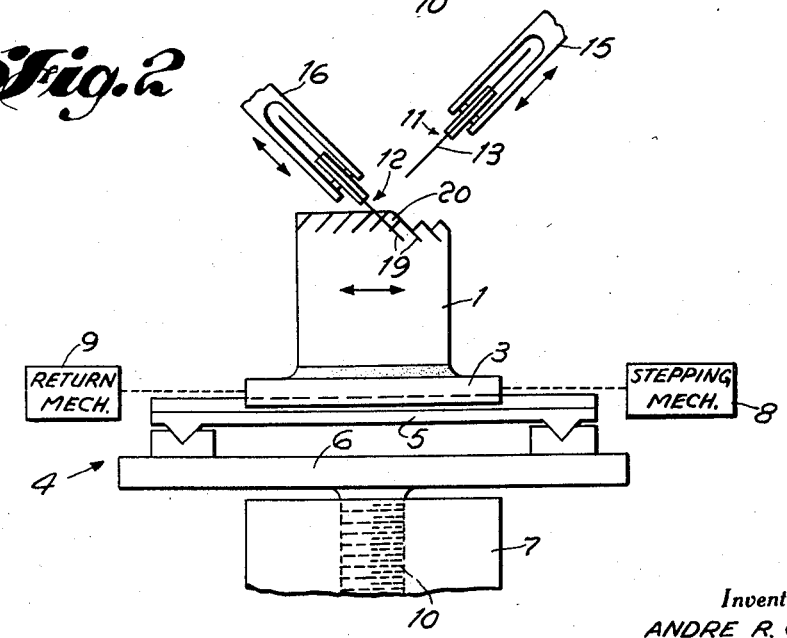

In operation a series of cuts 18 is made across surface 17 of block 1 by cutting wheel 11, stepping block 1 to the right between cuts by mechanism 8, as shown in Fig. 1. Then block 1 is returned to the left by mechanism 9, and another series of intersecting cuts 19 is made across surface 17 by cutting wheel 12, again stepping block 1 to the right by mechanism 8 between cuts, as shown in Fig. 2. A row of bars 20 having a square cross section is thereby removed from block 1. Successive series of cuts are made across the upper surface of block 1, with wheels 11 and 12 alternately, removing a row of bars 20 with each series, until the entire block 1 is cut. Irregular or triangular waste pieces are produced on the outer surfaces.

Figure 3:
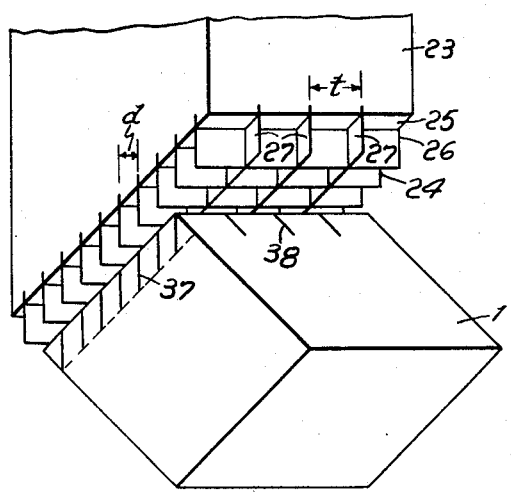
Figs. 3 and 4 are diagrammatic illustrations showing a method of cutting a block of semi-conductive material by ultrasonic machines, Fig. 3 being a perspective view of the tool in relation to the block of material.
Figure 4:
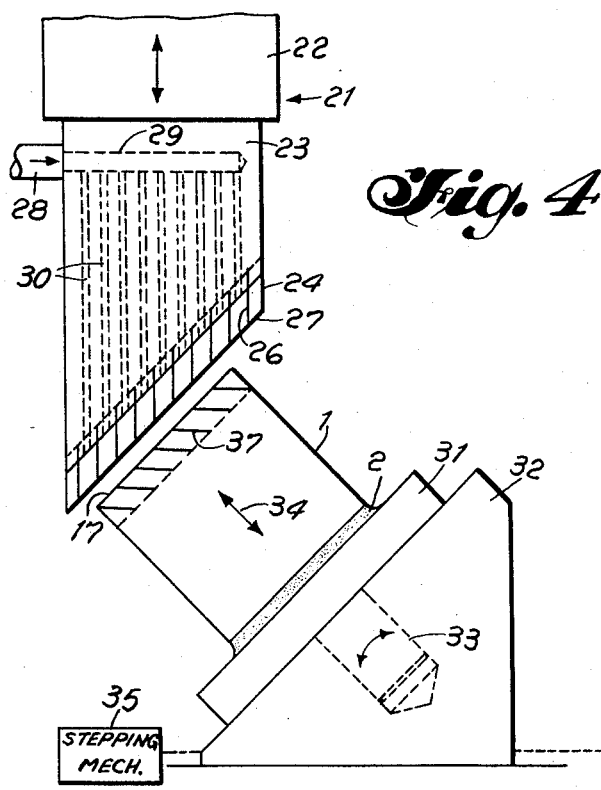

Another method of cutting, well known in the art, is by ultrasonic machining, as shown in Figs. 3 and 4. For example, a brief description of this type of machining is found in American Machinist, published by McGraw-Hill Publishing Company, volume 99, No. 8, April 11, 1955, pages 114–117.

The machine 21 (Fig. 4) includes a magnetostrictive transducer 22, on which is mounted a tool cone 23 with a tool 24 attached to its end. The lower end of cone 23 is a plane surface 25 sloped at 45 degrees to the vertical. The tool 24 comprises vertically disposed blades 26 and 27 attached, preferably by silver brazing, to the surface 25, blades 26 being parallel to the horizontal edges with horizontal spacing $d$ and blades 27 being parallel to the sloping edges with horizontal spacing $t$. It is necessary that the cone 23 and tool 24 be designed to resonate with transducer 22, within the ultrasonic frequency range of the machine. A slurry of abrasive grit such as diamond dust, boron carbide, silicon carbide, or aluminum oxide, suspended in a liquid, which may be water, is supplied from a hose 28, through passages 29 and 30 in cone 23, to the openings between the blades of tool 24. These grit particles are driven by the lower edges of tool 24 to cut the block of material 1.

The mounting arrangement (Fig. 4) includes a plate 31 on a base 32, with a spindle 33 for rotating plate 31 about the axis 34. Block 1 is attached with adhesive 2 to plate 31, with the surface 17 parallel to cone surface 25 adjacent tool 24. The mounting may be moved horizontally by stepping and return mechanisms 35 and 36 respectively.

In the operation of the apparatus shown in Figs. 3, and 4, the block 1 is first positioned with the surface 17 under the tool 24. The machine 21 is then operated and tool 24 lowered to make the cuts 37 with blades 26 and the cuts 38 with blades 27, as shown in Fig. 3. The block 1 is then rotated 180 degrees about axis 34, placing cuts 37 in a horizontal position, as shown in Fig. 4, and another series of cuts (not shown) perpendicular to cuts 37 is made by blades 26. The design may be such that blades 27 preferably align with cuts 38 after rotation. The block is then successively cut and rotated, progressively removing square bars of dimension $d$ on each side. Simultaneously, the bars are cut by blades 27 into short units of length $t$. Dimension $t$ is shown as relatively large for simplicity, but should preferably be somewhat less than $d$ to produce thin dice. Between series of cuts the block 1 is moved to the right by stepping mechanism 35 to bring the surface 17 under tool 24, with the blades in line with the previous cuts. After the entire block has been cut, the base is returned by return mechanism 36 for cutting the next block of material.

If the overall dimensions of tool 24 are too large, difficulty may be experienced in obtaining resonance over the entire tool area because of the difference in vertical length in cone 23. One remedy for this is by proper proportioning of the mass of cone 23. For best results, it might be desirable to have only one or a small number of blades 26 in tool 24.

There are many other possible cutting and mounting arrangements, as will be apparent to those skilled in the art. For example, the cuts may be made with abrasive wire, or with an electrolytic arrangement.

In Figs. 1 and 2, additional cutting wheels may be mounted parallel to wheel 11, designed to make a plurality of simultaneous cuts; and likewise additional wheels may be mounted parallel to wheel 12.

It would also be possible in Figs. 1 and 2 to have a cutting wheel or group of wheels in planes perpendicular to the planes of cutting wheels 11 and 12, to divide the bars 20 into dice.

A rotatable mounting arrangement, such as that shown in Fig. 4, may be used with any suitable type of cutting tool. For example, instead of ultrasonic machine 21, one or more cutting wheels may be provided having diamond cutting edges in place of blades 26, in which case equipment for feeding block 1 vertically and also in and out during cutting should be provided.

Figure 5:
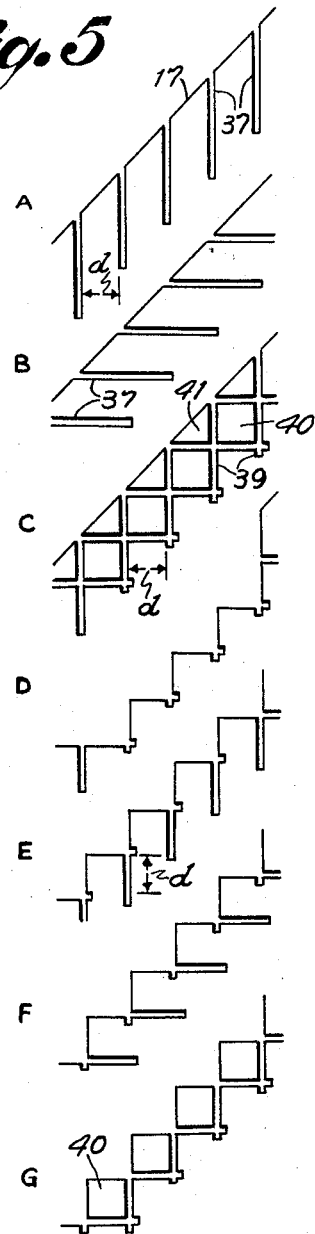
Fig. 5 is a diagrammatic illustration of one series of steps according to the invention, by which units may be divided from a block of semi-conductive material.

In cutting a block on a rotatable mounting such as that shown in Fig. 4, the steps may be as shown in Fig. 5. In step A the cuts 37 are made at an angle of 45 degrees to the surface 17. In step B, the block is rotated 180 degrees so that cuts 37 become horizontal. In step C cuts 39 are made at 45 degrees to the surface 17 and perpendicular to cuts 37, producing bars 40 of dimension $d$ square in cross section. In the outer layers triangular or irregular waste units 41 are also obtained. In step D these units 40 and 41 are removed, leaving a stepped surface. In step E the cuts then vertical are extended distance $d$. In step F the block is rotated 180 degrees, and in step G the cuts then vertical are extended to produce another row of square bars 40. The steps D, E, F and G are then repeated in turn until the entire block has been cut. In summary, the steps are A, cut; B, rotate; C, cut; D, remove units; E, cut; F, rotate; G, cut; D, remove units; etc.

In Fig. 5 each cut extends to a depth of twice $d$ from the upper edge of the adjacent stepped surface to extend the cuts a distance $d$ from the lower edge. Therefore, it is necessary after each rotation (step F) to make a cut to produce the bars (step G) and after the removal of the units (step D) to make another cut (step E) in preparation for the next row of units. If the cutting tool is made for cutting to a depth of three times $d$ from the upper edge, as shown in Figs. 1 and 2, the cutting steps E and G may be combined into a single step in which the units 40 are produced and the cut is extended in preparation for the next row of units. Thus, after the first row the steps are merely cut, remove units, and rotate, repeated until the block is completely cut.

It is of course obvious that in any of the described methods of cutting, the cuts do not need to be at 45 degrees to surface 17 of the block 1, or at 90 degrees to the intersecting cuts, but may be made at any suitable angles which intersect.

While I have described above the principles of my invention in connection with specific apparatus, it is to be clearly understood that this description is made only by way of example and not as a limitation to the scope of my invention as set forth in the objects thereof and in the accompanying claims.

I claim:

1. The method of dividing a block of semi-conductive material into small units comprising the steps of making a pair of cuts through one face of said body which are spaced at said face and intersect within the body.

2. The method of dividing a block of semi-conductive material into small units comprising the steps of making a pair of slanting cuts through one face of said body with said cuts being spaced at said face and intersecting within the body.

3. The method according to claim 2, wherein said cuts are perpendicular to each other.

4. The method of dividing a block of semi-conductive material into small units comprising the steps of making a first series of cuts through one face of the body, making a second series of cuts through said one face of the body, each of which latter cuts intersect a corresponding one of the former cuts and are spaced therefrom at said face of the body.

5. The method of dividing a block of semi-conductive material into small units comprising the steps of alternately making cuts in a first series of substantially parallel planes at an angle with respect to a single surface of said block and a second series of substantially parallel planes at an angle to said first planes and at an angle with respect to said single surface of said block, each cut being made to a depth substantially less than the minimum initial dimension of said block, and each cut in each series of planes intersecting at least two cuts in the other series of planes, to thereby progressively remove units from said block.

6. A method according to claim 5, wherein the cuts made in said first series of planes are perpendicular to the cuts made in said second series of planes.

7. A method according to claim 5, further including making cuts in a third series of planes at an angle to the cuts made in each of the first and second series of planes to a depth substantially equal to the depth of cut in each of said first and second series of planes and intersecting at least two cuts in each of said first and second series of planes to thereby remove units which are substantially smaller in each dimension than the corresponding dimension of said block.

8. The method of dividing a block of semiconductive material into small units comprising the steps of alternately making cuts in a first series of substantially parallel planes at an angle with respect to a single surface of said block and a second series of substantially parallel planes at an angle to said first planes and at an angle with respect to said single surface of said block, each cut being made to a depth substantially less than the minimum initial dimension of said block, and each cut in each series of planes intersecting at least two cuts in the other series of planes, the cuts made in said first series of planes being perpendicular to the cuts made in said second series of planes, said planes being at angles of 45 degrees to an initial surface of said block, to thereby progressively remove units from said block.

9. A method according to claim 8, further including making cuts in a third series of planes mutually perpendicular to the cuts made in said first and second series of planes to thereby remove units which are substantially smaller in each dimension than the corresponding dimension of said block.

10. The method of dividing a block of semi-conductive material into small units, said block being mounted with an axis at an angle to a series of fixed substantially parallel cutting planes comprising the steps of making cuts in said cutting planes in a single surface in rows across said block, and rotating said block 180° about said axis after each row of cuts, each said cut being made to a depth substantially less than the initial dimension of said block, said cutting and rotating steps being repeated alternately to thereby make cuts in a first series of substantially parallel planes in a single surface at an angle to said single surface and a second series of substantially parallel planes at an angle to said first series of planes and at an angle with respect to said single surface of said block, each cut in each series of planes with respect to the block intersecting at least two cuts in the other series of planes to thereby progressively remove units from said block.

11. A method according to claim 10, wherein said angle of said axis to said cutting planes is 45°, and said second series of planes are perpendicular to said first series of planes.

References Cited in the file of this patent

UNITED STATES PATENTS

| | | |
|---|---|---|
| 351,874 | Maloy | Nov. 2, 1886 |
| 1,491,287 | Ganning | Apr. 22, 1924 |
| 2,187,299 | Burkhardt | Jan. 16, 1940 |
| 2,695,478 | Comstock et al. | Nov. 30, 1954 |
| 2,774,194 | Thatcher | Dec. 18, 1956 |

FOREIGN PATENTS

| | | |
|---|---|---|
| 692,260 | Great Britain | June 3, 1953 |